(12) United States Patent
Russell, II et al.

(10) Patent No.: US 8,437,443 B2
(45) Date of Patent: May 7, 2013

(54) APPARATUSES AND METHODS FOR PRODUCTION OF RADIOISOTOPES IN NUCLEAR REACTOR INSTRUMENTATION TUBES

(75) Inventors: William Earl Russell, II, Wilmington, NC (US); Christopher J. Monetta, Wilmington, NC (US); David Grey Smith, Leland, NC (US); Russell Edward Stachowski, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1100 days.

(21) Appl. No.: 12/071,455

(22) Filed: Feb. 21, 2008

(65) Prior Publication Data
US 2009/0213977 A1 Aug. 27, 2009

(51) Int. Cl.
G21G 1/02 (2006.01)
G21G 1/00 (2006.01)

(52) U.S. Cl.
USPC .............................. 376/202; 376/189; 376/158

(58) Field of Classification Search .................. 376/158, 376/264, 342
See application file for complete search history.

(56) References Cited

U.S. PATENT DOCUMENTS

| | | | |
|---|---|---|---|
| 3,940,318 A | 2/1976 | Arino et al. |
| 3,998,691 A | 12/1976 | Shikata et al. |
| 4,196,047 A | 4/1980 | Mitchem et al. |
| 4,284,472 A | 8/1981 | Pomares et al. |
| 4,462,956 A | 7/1984 | Boiron et al. |
| 4,475,948 A | 10/1984 | Cawley et al. |
| 4,493,813 A | 1/1985 | Loriot et al. |
| 4,532,102 A | 7/1985 | Cawley |
| 4,597,936 A | 7/1986 | Kaae |
| 4,617,985 A | 10/1986 | Triggs et al. |
| 4,663,111 A | 5/1987 | Kim et al. |
| 4,729,903 A | 3/1988 | McGovern et al. |
| 4,782,231 A | 11/1988 | Svoboda et al. |
| 4,859,431 A | 8/1989 | Ehrhardt |
| 5,053,186 A | 10/1991 | Vanderheyden et al. |
| 5,145,636 A | 9/1992 | Vanderhevden et al. |
| 5,355,394 A | 10/1994 | Van Geel et al. |
| 5,400,375 A | 3/1995 | Suzuki et al. |
| 5,513,226 A | 4/1996 | Baxter et al. |
| 5,596,611 A | 1/1997 | Ball |
| 5,615,238 A | 3/1997 | Wiencek et al. |

(Continued)

FOREIGN PATENT DOCUMENTS

JP 2006162612 A * 6/2006

OTHER PUBLICATIONS

Sledge et al., Synovectomy of the Rheumatoid Knee Using Intra-Articular injection of Dysprosium-165-Ferric Hydroxide Macroaggregates, 1987, Journal of Bone and Joint Surgery.*

(Continued)

Primary Examiner — Jack W Keith
Assistant Examiner — Sean P Burke
(74) Attorney, Agent, or Firm — Harness, Dickey & Pierce, P.L.C.

(57) ABSTRACT

Example embodiments are directed to apparatuses and methods for producing radioisotopes in instrumentation tubes of operating commercial nuclear reactors. Irradiation targets may be inserted and removed from instrumentation tubes during operation and converted to radioisotopes otherwise unavailable from nuclear reactors. Example apparatuses may continuously insert, remove, and store irradiation targets to be converted to useable radioisotopes.

8 Claims, 8 Drawing Sheets

U.S. PATENT DOCUMENTS

| | | | |
|---|---|---|---|
| 5,633,900 | A | 5/1997 | Hassal |
| 5,682,409 | A | 10/1997 | Caine |
| 5,758,254 | A | 5/1998 | Kawamura et al. |
| 5,867,546 | A | 2/1999 | Hassal |
| 5,871,708 | A | 2/1999 | Park et al. |
| 5,910,971 | A | 6/1999 | Ponomarev-Stepnoy et al. |
| 6,056,929 | A | 5/2000 | Hassal |
| 6,160,862 | A | 12/2000 | Wiencek et al. |
| 6,192,095 | B1 | 2/2001 | Sekine et al. |
| 6,233,299 | B1 | 5/2001 | Wakabayashi |
| 6,456,680 | B1 | 9/2002 | Abalin et al. |
| 6,678,344 | B2 | 1/2004 | O'Leary et al. |
| 6,751,280 | B2 | 6/2004 | Mirzadeh et al. |
| 6,804,319 | B1 | 10/2004 | Mirzadeh et al. |
| 6,895,064 | B2 | 5/2005 | Ritter |
| 6,896,716 | B1 | 5/2005 | Jones, Jr. |
| 7,157,061 | B2 | 1/2007 | Meikrantz et al. |
| 7,235,216 | B2 | 6/2007 | Kiselev et al. |
| 2002/0034275 | A1 | 3/2002 | Abalin et al. |
| 2003/0012325 | A1 | 1/2003 | Kernert et al. |
| 2003/0016775 | A1 | 1/2003 | Jamriska, Sr. et al. |
| 2003/0103896 | A1 | 6/2003 | Smith |
| 2003/0179844 | A1 | 9/2003 | Filippone |
| 2004/0091421 | A1 | 5/2004 | Aston et al. |
| 2004/0105520 | A1 | 6/2004 | Carter |
| 2004/0196942 | A1 | 10/2004 | Mirzadeh et al. |
| 2004/0196943 | A1 | 10/2004 | Di Caprio |
| 2005/0105666 | A1 | 5/2005 | Mirzadeh et al. |
| 2005/0118098 | A1 | 6/2005 | Vincent et al. |
| 2006/0002503 | A1* | 1/2006 | Ougouag et al. ............ 376/381 |
| 2006/0062342 | A1 | 3/2006 | Gonzalez Lepera et al. |
| 2006/0126774 | A1 | 6/2006 | Kim et al. |
| 2007/0133731 | A1* | 6/2007 | Fawcett et al. ............ 376/202 |
| 2007/0133734 | A1 | 6/2007 | Fawcett et al. |
| 2007/0297554 | A1 | 12/2007 | Lavie et al. |
| 2008/0031811 | A1 | 2/2008 | Ryu et al. |
| 2008/0076957 | A1 | 3/2008 | Adelman |
| 2008/0240330 | A1* | 10/2008 | Holden ............ 376/190 |

OTHER PUBLICATIONS

Ketring et al., Production and Supply of High Specific Activity Radioisotopes for Radiotherapy Applications, Jan. 2003, Alasbimn Journal, vol. 5, No. 19.*

Knapp et al., Production of medical radioisotopes in the ORNL high flux isotope reactor for cancer treatment and arterial restenosis therapy after PICA, Jan. 1999, Czechoslovak Journal of Physics, vol. 49, Issue 1, pp. 799-809.*

Betti, M., "Environmental monitoring of radioisotopes by mass spectrometry and radiochemical methods in urban areas", (2000), Microchemical Journal, 67, pp. 363-373.*

Ketring et al. "Production and Supply of High Specific Activity Radioisotopes for Radiotherapy Applications," Alasbimn Journal, vol. 5, No. 19, Jan. 2003.*

Betti, M, "Environmental monitoring of radioisotopes by mass spectrometry and radiochemical methods in urban areas," 67 Microchemical Journal 363-373 (2000).*

Sledge et al., Synovectomy of the Rheumatoid Knee Using Intra-Articular injection of Dysprosium-165-Ferric Hydroxide Macroaggregates, 69 Journal of Bone and Joint Surgery, 970-975 (1987).*

Delbeke et al. : "Pu-breeding feasibility in PWR" Nuclear Engineering and Design, Amsterdam, NL, vol. 237, No. 11, May 10, 2007, pp. 1158-1163, XP022070301, ISSN: 0029-5493.

European Search Report and Opinion dated Mar. 22, 2010.

* cited by examiner

250a

APPARATUSES AND METHODS FOR PRODUCTION OF RADIOISOTOPES IN NUCLEAR REACTOR INSTRUMENTATION TUBES

BACKGROUND

1. Field

Example embodiments generally relate to radioisotopes having medical applications and apparatuses and methods for production thereof in nuclear reactors.

2. Description of Related Art

Radioisotopes have a variety of medical applications stemming from their ability to emit discreet amounts and types of ionizing radiation. This ability makes radioisotopes useful in cancer-related therapy, medical imaging and labeling technology, cancer and other disease diagnosis, and medical sterilization.

Short-term radioisotopes, having half-lives on the order of days or even hours, are of particular importance in cancer and other medical therapy for their ability to produce a unique radiation profile and yet quickly decay into harmless, stable isotopes excreted from the body after the radiation dose is delivered in the specific application. However, the short half-lives of these short-term radioisotopes also make their acquisition and handling difficult. Short-term radioisotopes are conventionally produced by bombarding stable parent isotopes in accelerators or low-power reactors with neutrons on-site at medical facilities or at nearby production facilities. These radioisotopes are quickly transported due to the relatively quick decay time and the exact amounts of radioisotopes needed in particular applications. Further, production of medical short-term radioisotopes generally requires cumbersome and expensive irradiation and extraction equipment, which may be cost-, space-, and/or safety-prohibited at medical facilities.

Several short-term radioisotopes having medical applications may be generated through nuclear fission, and thus in large quantities at nuclear power plants. For example, fission of Uranium-235 in nuclear fuel may produce large amounts of Technetium-99, which is useful in multiple imaging and cancer diagnosis applications. However, the short-term radioisotopes produced in nuclear fuel may be intermixed with a wide spectrum of other nuclear fission byproducts. Extraction of the useful short-term radioisotopes may have unacceptable radiation and chemical exposure hazards and/or may require an amount of time in which the short-term radioisotopes may decay to unusable amounts.

Because of difficulties with production and the lifespan of short-term radioisotopes, demand for such radioisotopes may far outweigh supply, particularly for those radioisotopes having significant medical applications in persistent disease areas such as cancer. The cost of effective short-term radioisotopes may become prohibitively high compared to typical healthcare costs for diseases such as cancer.

SUMMARY

Example embodiments are directed to methods of producing radioisotopes, useable in medical applications, in commercial nuclear reactors and associated apparatuses. Example methods may utilize instrumentation tubes conventionally found in nuclear reactor vessels to expose irradiation targets to neutron flux found in the operating nuclear reactor. Short-term radioisotopes may be produced in the irradiation targets due to the flux. These short-term radioisotopes may then be relatively quickly and simply harvested by removing the irradiation targets from the instrumentation tube and reactor containment, without shutting down the reactor or requiring chemical extraction processes. The short-term radioisotopes may then be immediately transported to medical facilities for use in, for example, cancer therapy.

Example embodiments may include apparatuses for producing radioisotopes in nuclear reactors and instrumentation tubes thereof. Example embodiments may include one or more subsystems configured to insert and remove irradiation targets from an instrumentation tube of an operating commercial nuclear reactor. Example embodiments may include a tube subsystem, an irradiation target drive subsystem, and/or an irradiation target storage and removal subsystem for inserting and removing irradiation targets from an instrumentation tube. Example embodiments may preserve a linear order of irradiation targets used therein to permit tracking and measurement of radioisotopes produced in example embodiment irradiation targets.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially and concurrently or may sometimes be executed in the reverse order, depending upon the functionality/acts involved.

Figure 1:
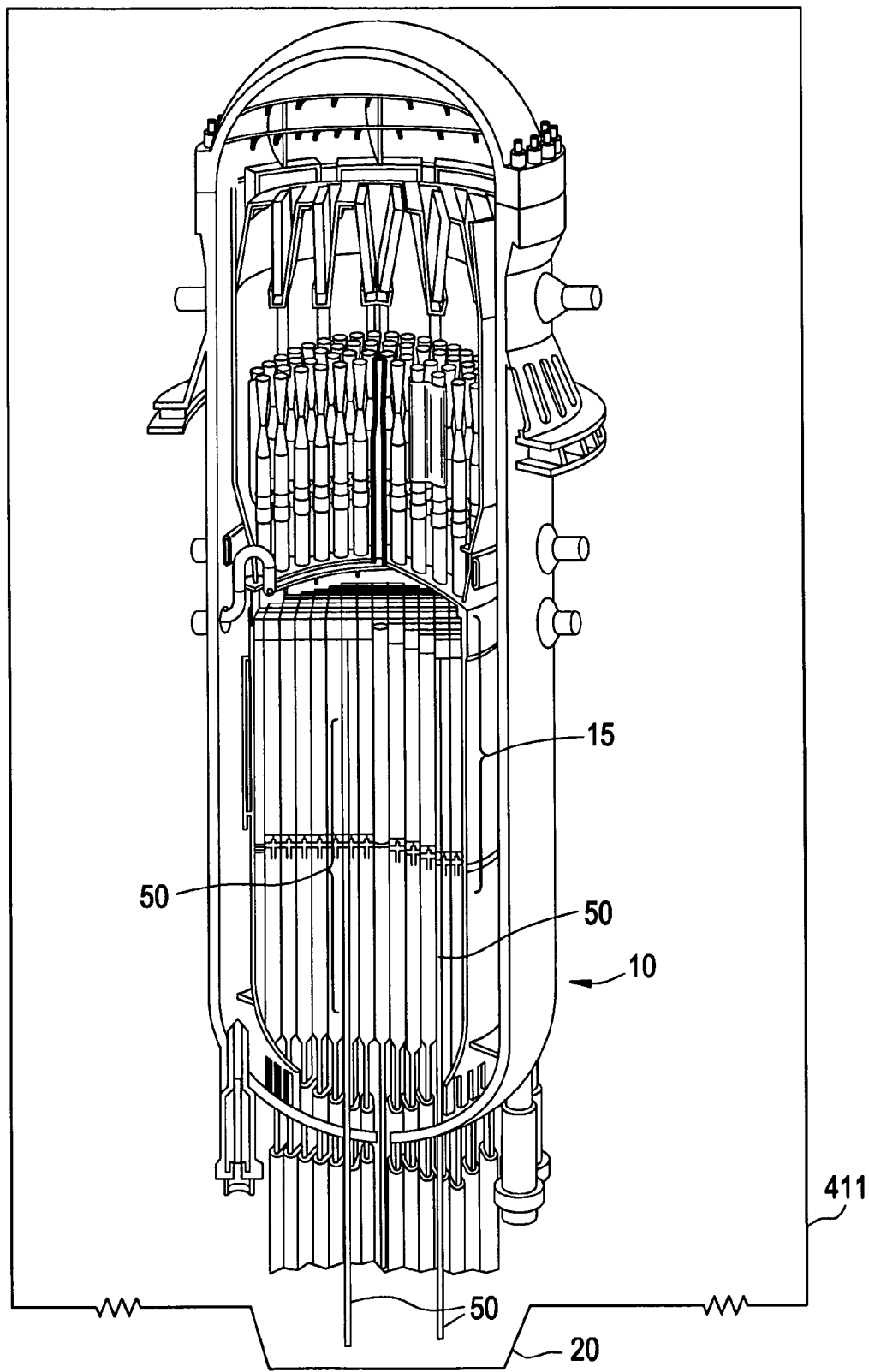
FIG. 1 is an illustration of a conventional nuclear reactor having an instrumentation tube.

FIG. 1 is an illustration of a conventional reactor pressure vessel 10 usable with example embodiments and example methods. Reactor pressure vessel 10 may be used in at least a 100 MWe commercial light water nuclear reactor conventionally used for electricity generation throughout the world. Reactor pressure vessel 10 may be positioned within a containment structure 411 that serves to contain radioactivity in the case of an accident and prevent access to reactor 10 during operation of the reactor 10. A cavity below the reactor vessel 10, known as a drywell 20, serves to house equipment servicing the vessel such as pumps, drains, instrumentation tubes, and/or control rod drives. As shown in FIG. 1, at least one instrumentation tube 50 extends vertically into the vessel 10 and well into or through core 15 containing nuclear fuel and relatively high amounts of neutron flux during operation of the core 15. Instrumentation tubes 50 may be generally cylindrical and widen with height of the vessel 10; however, other instrumentation tube geometries are commonly encountered in the industry. An instrumentation tube 50 may have an inner diameter and/or clearance of about 1 inch, for example.

The instrumentation tubes 50 may terminate below the reactor vessel 10 in the drywell 20. Conventionally, instrumentation tubes 50 may permit neutron detectors, and other types of detectors, to be inserted therein through an opening at a lower end in the drywell 20. These detectors may extend up through instrumentation tubes 50 to monitor conditions in the core 15. Examples of conventional monitor types include wide range detectors (WRNM), source range monitors (SRM), intermediate range monitors (IRM), and/or Local Power Range Monitors (LPRM). Access to the instrumentation tubes 50 and any monitoring devices inserted therein is conventionally restricted to operational outages due to containment and radiation hazards.

Although vessel 10 is illustrated with components commonly found in a commercial Boiling Water Reactor, example embodiments and methods may be useable with several different types of reactors having instrumentation tubes 50 or other access tubes that extend into the reactor. For example, Pressurized Water Reactors, Heavy-Water Reactors, Graphite-Moderated Reactors, etc. having a power rating from below 100 Megawatts-electric to several Gigawatts-electric and having instrumentation tubes at several different positions from those shown in FIG. 1 may be useable with example embodiments and methods. As such, instrumentation tubes useable in example methods may be any protruding feature at any geometry about the core that allows enclosed access to the flux of the nuclear core of various types of reactors.

Applicants have recognized that instrumentation tubes 50 may be useable to quickly and constantly generate short-term radioisotopes on a large-scale basis without the need for chemical or isotopic separation and/or waiting for reactor shutdown of commercial reactors. Example methods may include inserting irradiation targets into instrumentation tubes 50 and exposing the irradiation targets to the core 15 while operating, thereby exposing the irradiation targets to the neutron flux commonly encountered in the operating core 15. The core flux may convert a substantial portion of the irradiation targets to a useful radioisotope, including short-term radioisotopes useable in medical applications. Irradiation targets may then be withdrawn from the instrumentation tubes 50, even during ongoing operation of the core 15, and removed for medical and/or industrial use. Example embodiments that enable example methods are discussed below, including further details of example methods enabled by the example embodiments.

Figure 2:
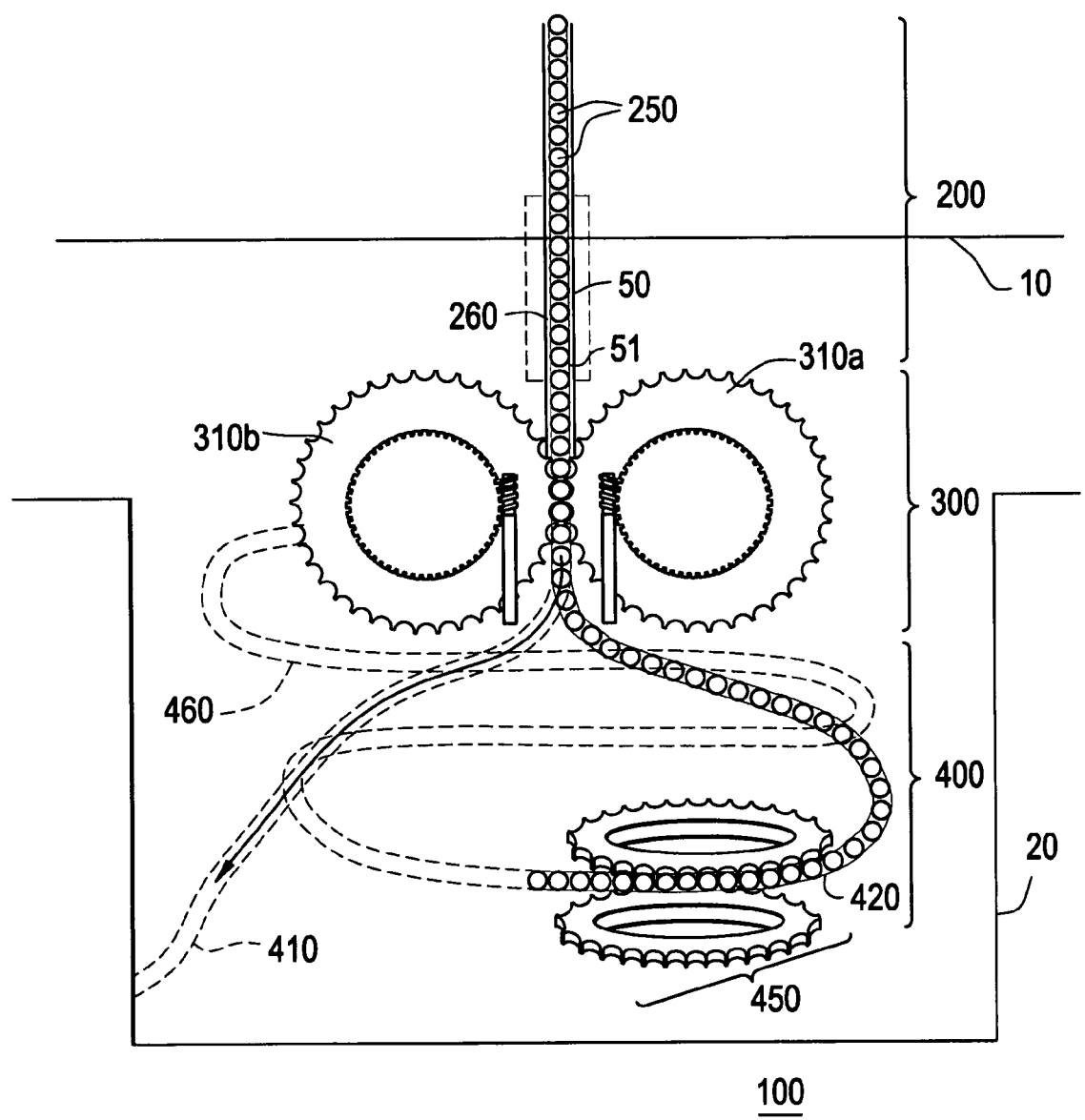
FIG. 2 is an illustration of an example embodiment system for producing short-term radioisotopes in a nuclear reactor.

FIG. 2 is an illustration of an example embodiment system for producing radioisotopes in a nuclear reactor. Example embodiment radioisotope generation system 100 is shown in FIG. 2 positioned below an instrumentation tube 50 in drywell 20, below reactor pressure vessel 10. Example embodiment radioisotope generation system 100 may insert and remove irradiation targets 250 into/from instrumentation tube 50 for irradiation in the operating vessel 10. Example embodiment radioisotope generation system 100 may include three different subsystems, each discussed in turn below—instrumentation tube subsystem 200; irradiation target drive subsystem 300; and/or irradiation target storage and removal subsystem 400. Irradiation targets 250 and their use in example embodiments and methods are discussed lastly below.

Tube Subsystem

Figure 3:
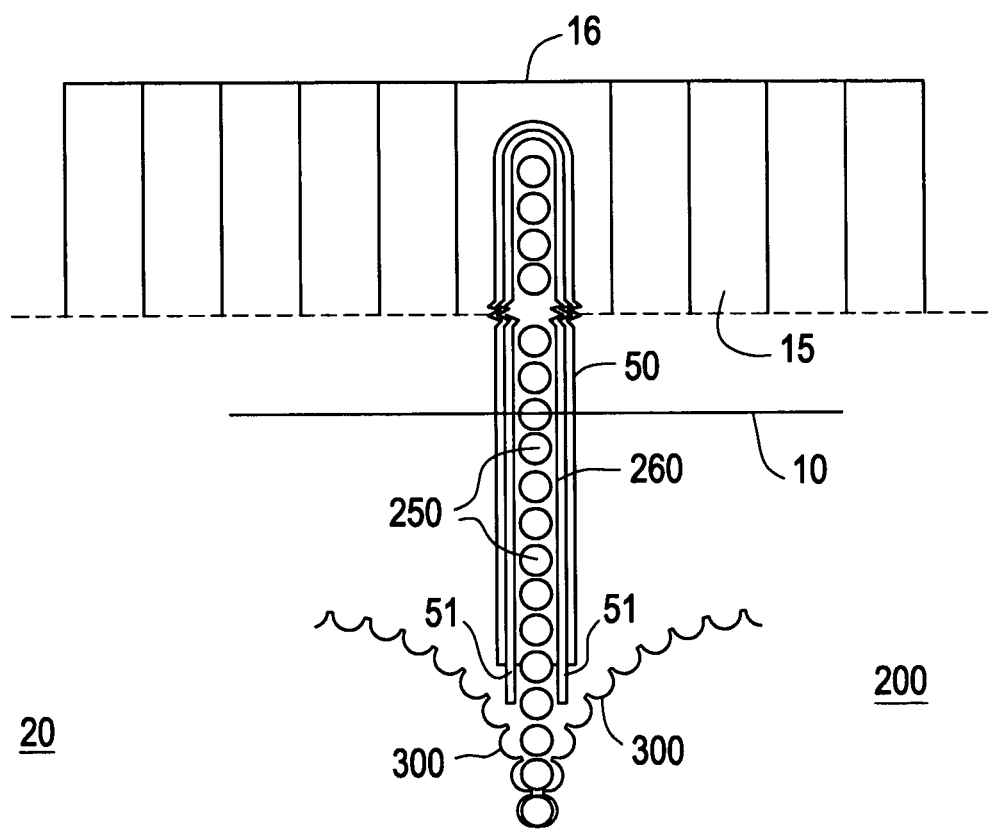
FIG. 3 is an illustration of an example embodiment tube subsystem of example embodiment systems.
Figure 5:
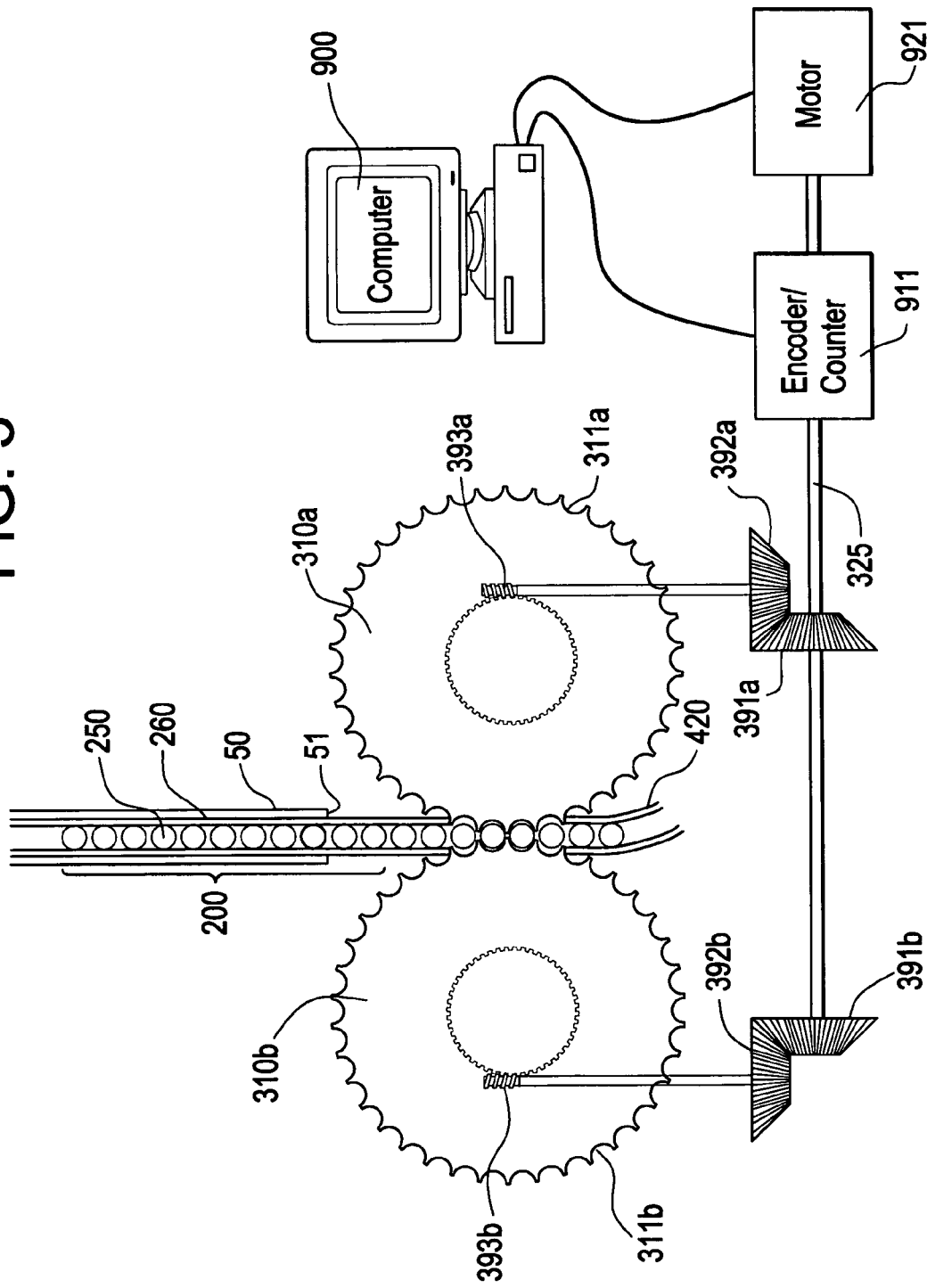
FIG. 5 is an illustration of an example embodiment irradiation target drive subsystem usable with example embodiment systems.

FIG. 3 is an illustration of an example embodiment instrumentation tube subsystem 200. As shown in FIG. 3, instrumentation tube 50, as also shown in FIGS. 1-2, extends from a lower position in the drywell 20 into reactor vessel 10 and nuclear core 15 containing nuclear fuel. Irradiation targets 250 may be linearly pushed into and removed from instrumentation tube 50 via instrumentation tube opening 51 by irradiation drive subsystem 300 (FIG. 5).

Instrumentation tube 50 may extend to near a top 16 of the core 15. Thus, irradiation targets 250 may be linearly positioned and held through the vertical length of the nuclear core 15 in instrumentation tube 50. The neutron flux in the core 15 may be known and may be sufficiently high to convert a substantial amount of the irradiation targets 250 in the tube 50 into useful short-term radioisotopes. As will be discussed below with reference to FIGS. 8A and 8B, the type of target 250 and vertical position in the nuclear core 15 may allow precise exposure time and radioisotope generation rate calculation to maximize radioisotope generation and activity.

A sleeve 260 may be inserted into instrumentation tube 50 in order to provide further containment, shielding, and geometry matching of the irradiation targets 250. Sleeve 260 may be generally rigid and fabricated from a material that substantially maintains its physical characteristics when exposed to an operating nuclear core 15. Sleeve 260 may be fabricated of, for example, stainless steel, aluminum, a zirconium alloy, Inconel, nickel, titanium, etc.

Sleeve 260 may extend beyond opening 51 of instrumentation tube 50 to provide guidance and alignment beyond instrumentation tube 50. For example, sleeve 260 may extend downward and terminate closer to irradiation target drive subsystem 300 in order to properly guide irradiation targets 250 into and out of the irradiation target drive subsystem 300, which may be located further below vessel 10 than opening 51.

Sleeve 260 may provide a smooth, constant inner surface to facilitate irradiation target 250 insertion and removal into/from instrumentation tube 50. As discussed above, instrumentation tube 50 may have a variety of geometries and/or change width with vertical distance into vessel 10. Sleeve 260 may have a varying outer diameter to account for the geometry of instrumentation tube 50 but may have a uniform inner diameter associated with the size of irradiation targets 250. For example, the sleeve 260 may have an inner diameter narrow enough to prevent irradiation targets 250 from shifting or changing position in line through instrumentation tube 50, to allow preservation of irradiation target order, to allow order-based identification, etc.

Figure 4A:
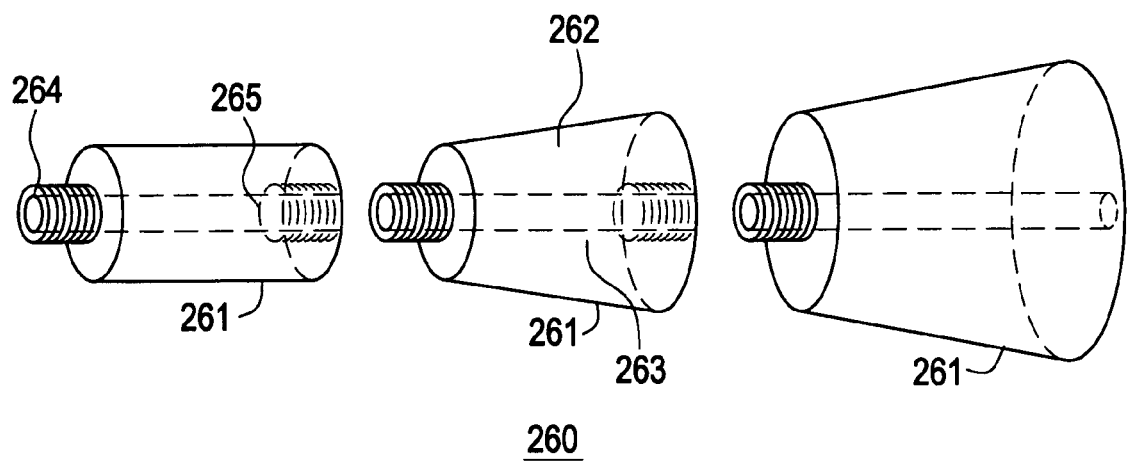
FIGS. 4A and 4B are illustrations of example embodiment sleeves usable with example embodiment systems.
Figure 4B:
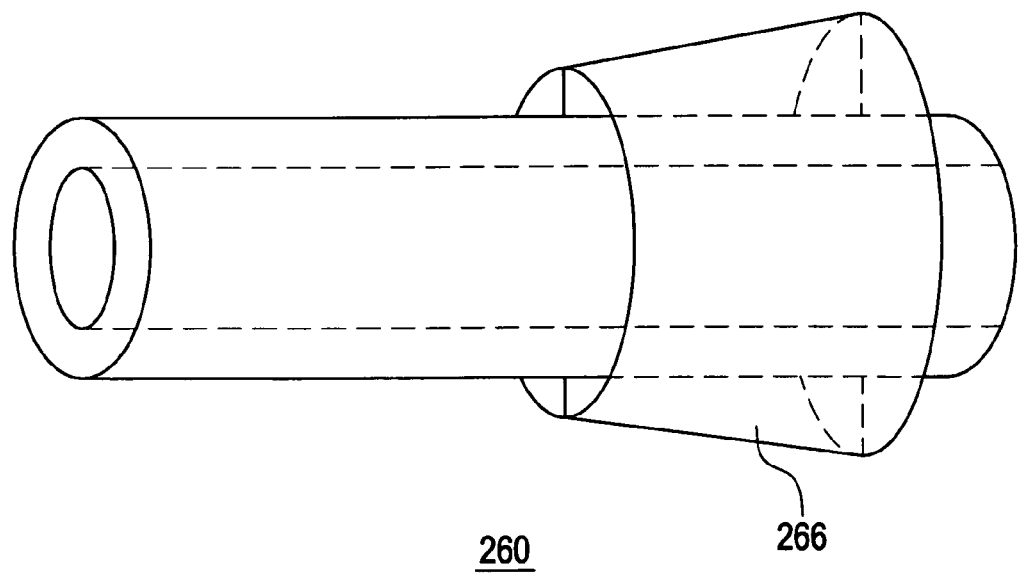

In an example embodiment, sleeve 260 may be modular and consist of several pieces that permit assembly and insertion into instrumentation tube 50. As shown in FIGS. 4A and 4B, several different components may form a modular sleeve 260. In FIG. 4A, segments 261 of a sleeve 260 are shown. Each segment 261 may include a mating element 264 and/or 265 that may join each segment 261 to another segment 261 and permit irradiation target 250 to pass through segments 261 by being hollow. Mating elements 264 and 265 may include, for example, a hollow threaded end and hole or a hollow tang and receptor. Segments 261 may have varying outer diameters 262 to meet or mirror the geometry of instrumentation tube 50 yet small enough to pass through opening 51. Segments 261 may include inner diameters 263 that are relatively constant and of a width compatible with receiving irradiation targets 250. Thus, if segments 261 are inserted into instrumentation tube 50 individually, segments 261 may be assembled inside instrumentation tube 50 to provide a continuous, linear inner diameter for irradiation targets 250 inserted into tube 50 and sleeve 260.

Alternatively, as shown in FIG. 4B, sleeve 260 may have a substantially constant inner and outer diameter, and one or more modular collets 266 may be coupled to sleeve 260 to provide a fit between instrumentation tube 50 and sleeve 260/collet 266. Thus, collets 266 may be inserted and assembled around sleeve 260 in instrumentation tube 50 to provide a continuous inner diameter for irradiation targets 250 inserted into tube 50 and sleeve 260 surrounded by modular collets 266.

Irradiation Target Drive Subsystem

FIG. 5 is an illustration of an example embodiment irradiation target drive subsystem 300. As shown in FIG. 5, two driving gears 310a and 310b may receive and/or transmit irradiation targets 250 from/to sleeve 260 or opening 51 of instrumentation tube 50. Driving gears 310a and 310b may be positioned opposite each other. Driving gears 310a and 310b may be positioned below and on either side of instrumentation tube 50 in drywell 20 below vessel 10. By sizing and positioning driving gears 310a and 310b and target drive subsystem 300 based on the amount of space in drywell 20 below vessel 10, radioisotope generation system 100 may fit entirely within drywell 20 of many current operating nuclear reactors worldwide.

Driving gears 310a and 310b may have specially-shaped circumferential or lateral surfaces 311a and/or 311b that complement the shape of irradiation targets 250 so as to securely grab and hold or fit with irradiation targets 250 coming between driving gears 310a and 310b. For example, as shown in FIG. 5, surfaces 311a and 311b may have a scalloped shape in order to mate with spherical irradiation targets 250. The scallops in surfaces 311a and 311b may have radii substantially similar to that of irradiation targets 250 to securely hold and move irradiation targets 250 coming between driving gears 310a and 310b while maintaining the same linear order of irradiation targets 250 into and out of instrumentation tube 50. Alternatively, surfaces 311a and 311b may have other shapes to match and/or mate with alternately-shaped irradiation targets as may be substituted by one skilled in the art.

Driving gears 310a and 310b may rotate in opposite directions about parallel axes perpendicular to instrumentation tube 50, so as raise or lower irradiation targets 250 passing therebetween. For example, as shown in FIG. 5, if driving gear 310a rotates in a clockwise direction and driving gear 310b in a counter-clockwise direction, irradiation targets 250 between and below the axes of rotation of the driving gears 310a and 310b may be elevated from storage and removal subsystem 400 into tube subsystem 200. Oppositely, if driving gears 310a and 310b are rotated in the reverse directions, such that driving gear 310a is rotated in a counter-clockwise direction and driving gear 310b is rotated in a clockwise direction, irradiation targets 250 may be lowered from tube subsystem 200 into removal subsystem 400.

Driving gears 310a and 310b and other example driving mechanisms useable in irradiation target drive subsystem 300 may preserve the linear order of irradiation targets 250 passing between tube subsystem 200 and irradiation target storage and removal subsystem 400. In this way, overall linear order of irradiation targets 250 may be preserved throughout example embodiment system 100, and any irradiation target monitoring dependent upon irradiation target 250 vertical order within tube 50 may be successfully carried out.

As shown in FIG. 5, driving gears 310a and 310b may be driven by a driving power subsystem 390 that allows synchronous movement between driving gears 310a and 310b. The example embodiment shown in FIG. 5 shows a plurality of individual gears transferring motion from a power drive shaft 325 to driving gears 310a and 310b. Power drive shaft 325 may connect to toothed lower transfer gears 391a and 391b that mesh with a toothed area of upper transfer gears 392a and 392b, respectively, so that upper transfer gears 392a and 392b may be rotated by rotation of power drive shaft 325. Upper transfer gears 392a and 392b may include threaded or interlocking ends 393a and 393b, respectively, that mesh or otherwise interlock with driving gears 310a and 310b, respectively. In this way, both driving gears 310a and 310b may be rotated by rotation of power drive shaft 325.

As shown in FIG. 5, lower transfer gears 391a and 391b may mesh with opposite orientations to driving gears 310b and 310a, respectively, so as to rotate driving gears 310a and 310b in opposite directions as described above. Upper transfer gears 392a and 392b may have similar radii and mesh with driving gears 310b and 310a at similar radii so as to impart symmetrical angular motion (driving gears 310a and 310b may have negative angular motions of each other) to driving gears 310a and 310b. Thus, if driving gears 310a and 310b possess similar outer radii of surfaces 311a and 311b, irradiation targets 250 may fit at a constant circumferential position within surfaces 311a and 311b so as to enable the holding and fitting of irradiation targets 250 through driving gears 310a and 310b described above.

It is understood that any known method of arranging gears and/or providing power to driving gears 310a and 310b may be used in example embodiments. For example, although a worm gear system is shown on upper transfer gears 392a and 392b to drive driving gears 310a and 310b, other interfaces, including a conventional toothed-gear and/or friction plate interface, may be used. Alternatively, for example, driving gears 310a and 310b may be directly powered by electric motors without the need for driving power subsystem 390 and power drive shaft 325.

Power drive shaft 325 may be powered locally by a variety of means including a motor 921, from gearings off primary circulation pumps, etc., or may be powered remotely. As shown in FIG. 5, power drive shaft 325 may be connected to a motor 921 capable of rotating power drive shaft 325. A digital counter 911 may be further connected to power drive shaft 325 in order to detect a position, number of rotations, and/or angular velocity of power drive shaft 325. Both digital counter 911 and motor 921 may be communicatively connected to a computer 900.

Computer 900 may be appropriately programmed, input with, or have access to pertinent system information including, for example, radii of and connection among gears used in example embodiment system 100, position of gears an irradiation targets in other subsystems 200 and 400, reactor axial flux profile, irradiation target dimensions, makeup, and linear order, and/or information from digital counter 911 and motor 921. With this information, computer 900 may automatically actuate motor 921 and move irradiation targets 250 through example embodiment system 100. Such automatic actuation may be based on the known system and reactor information, including online status. In this way, computer 900 may connect with and coordinate other subsystems, including irradiation target storage and removal subsystem 400, described below, so as to permit synchronization throughout example embodiment system 100.

Irradiation target drive subsystem 300 may insert and remove irradiation targets 250 from tube subsystem 200 at any desired speed, depending on the rotation rate of driving gears 310a and 310b and radii of driving gears 310a and 310b. Further, driving gears 310a and 310b may serve to maintain the axial position of irradiation targets 250 within tube subsystem 200. As driving gears 310a and 310b may be held in place by, for example, a worm gear system used on threaded ends 393a and 393b of upper transfer gears 392a and 392b and driving gears 310a and 310b, irradiation targets 250 may be held in axial position with no room to escape between locked driving gears 310a and 310b and tube 50 and/or sleeve 260. That is, threaded or interlocking ends 393a and 393b may include screws that interface with driving gears 310a and 310b so as to provide motion to and rotate driving gears 310a and 310b but prevent driving gears 310a and 310b from driving the driving power subsystem 390.

By preserving both axial order of irradiation targets 250 in the instrumentation tube 50 and order of irradiation targets 250 inserted or removed from the core 15, tracking and identification of irradiation targets 250 passing through irradiation target drive subsystem 300 may be enabled.

Although irradiation target drive subsystem is illustrated as a series of gears in FIG. 5, other mechanisms of raising and/or lowering irradiation targets 250 between subsystems 200 and 400 may be used as will be appreciated by one skilled in the art. For example, an actuator or pneumatic drive between subsystems 200 and 400 may serve to move and hold irradiation targets 250 between these subsystems. In this way other mechanisms may be used for target drive subsystem 300 while still permitting example embodiment radioisotope generation system 100 to function in inserting and removing irradiation targets into instrumentation tubes 50 of operating nuclear reactors.

Irradiation Target Storage and Removal Subsystem

Figure 6:
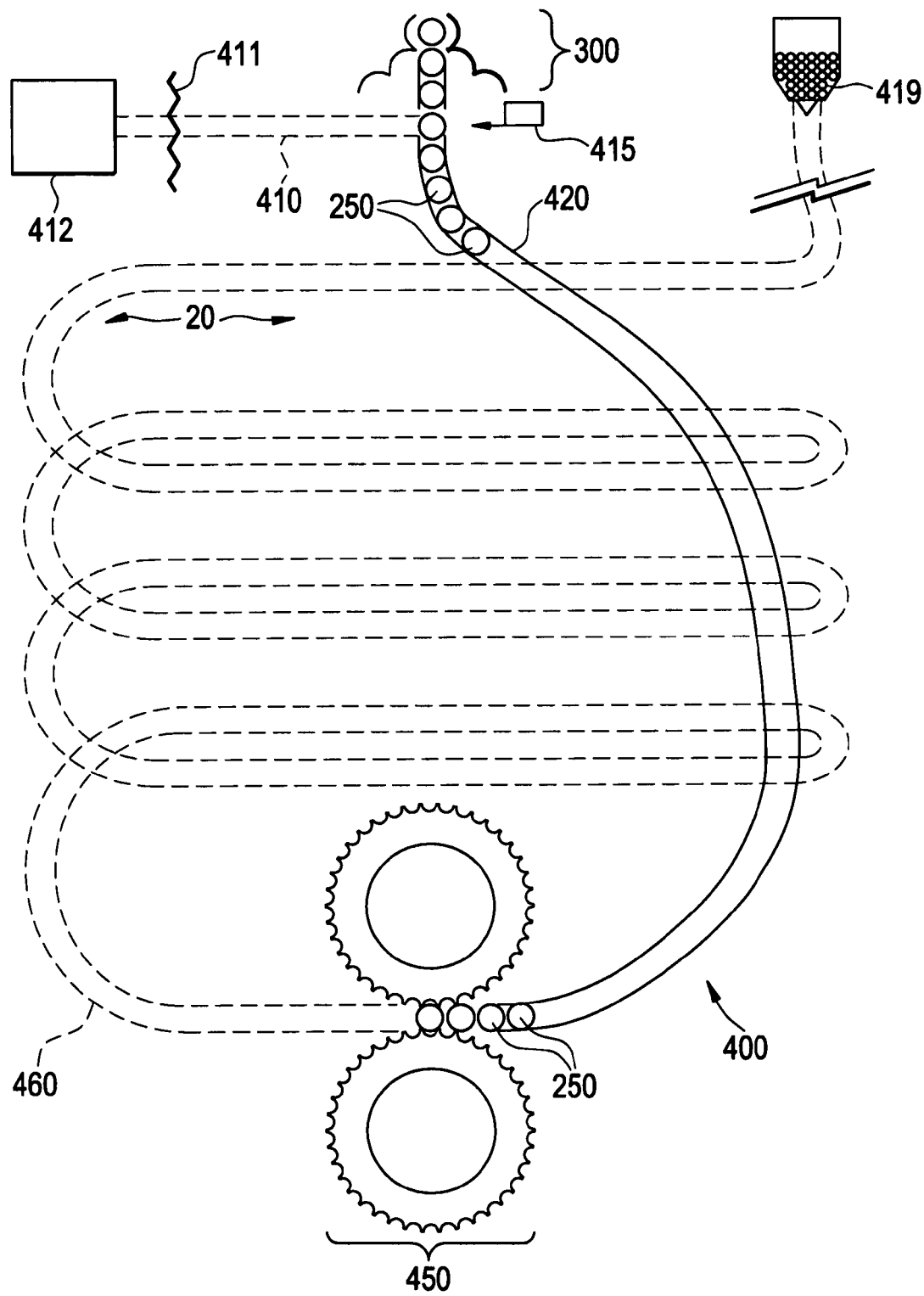
FIG. 6 is an illustration of an example embodiment irradiation target storage subsystem usable with example embodiment system.

FIG. 6 is an illustration of an example embodiment irradiation target storage and removal subsystem 300. As shown in FIG. 6, irradiation targets 250 may enter or leave the irradiation target drive subsystem 300 near the top of storage and removal subsystem 400. Irradiation targets 250 may enter/leave storage subsystem 300 from a holding tube 420 running from an outlet of irradiation target drive subsystem 300 down into a lower location in drywell 20. Holding tube 420 may be a rigid tube fabricated of a material designed to substantially maintain its physical characteristics when exposed to radiation present near an operating nuclear reactor, including, for example, stainless steel, nickel-based allow, titanium, etc.

Unirradiated (fresh) irradiation targets 250 may travel up through holding tube 420 to be loaded into irradiation target drive subsystem 300 and/or irradiated irradiation targets 250 (now containing short-term radioisotopes from being exposed to core neutron flux) may travel down into holding tube 420 to be stored in holding tube 420 after removal from the operating reactor by the irradiation target drive subsystem 300. Holding tube 420 may include an exit tube 410 located near a gap in holding tube 420 and a removal mechanism 415, which is described below with respect to FIG. 7.

Removal mechanism 415 may push irradiation targets 250 from the holding tube 420 into an exit tube 410. Exit tube 410 may then pass through containment 411 to an exterior holding area 412, where irradiation targets 250 may be harvested for use as radioisotopes. Exit tube 410 may pass through containment 411 in a variety of ways, including through known piping and/or hatchways in the drywell 20 that exits containment 411 and/or through a specially-designed passage through containment 411. Such a passage may be specially designed to sustain containment pressurization and/or security.

Figure 7:
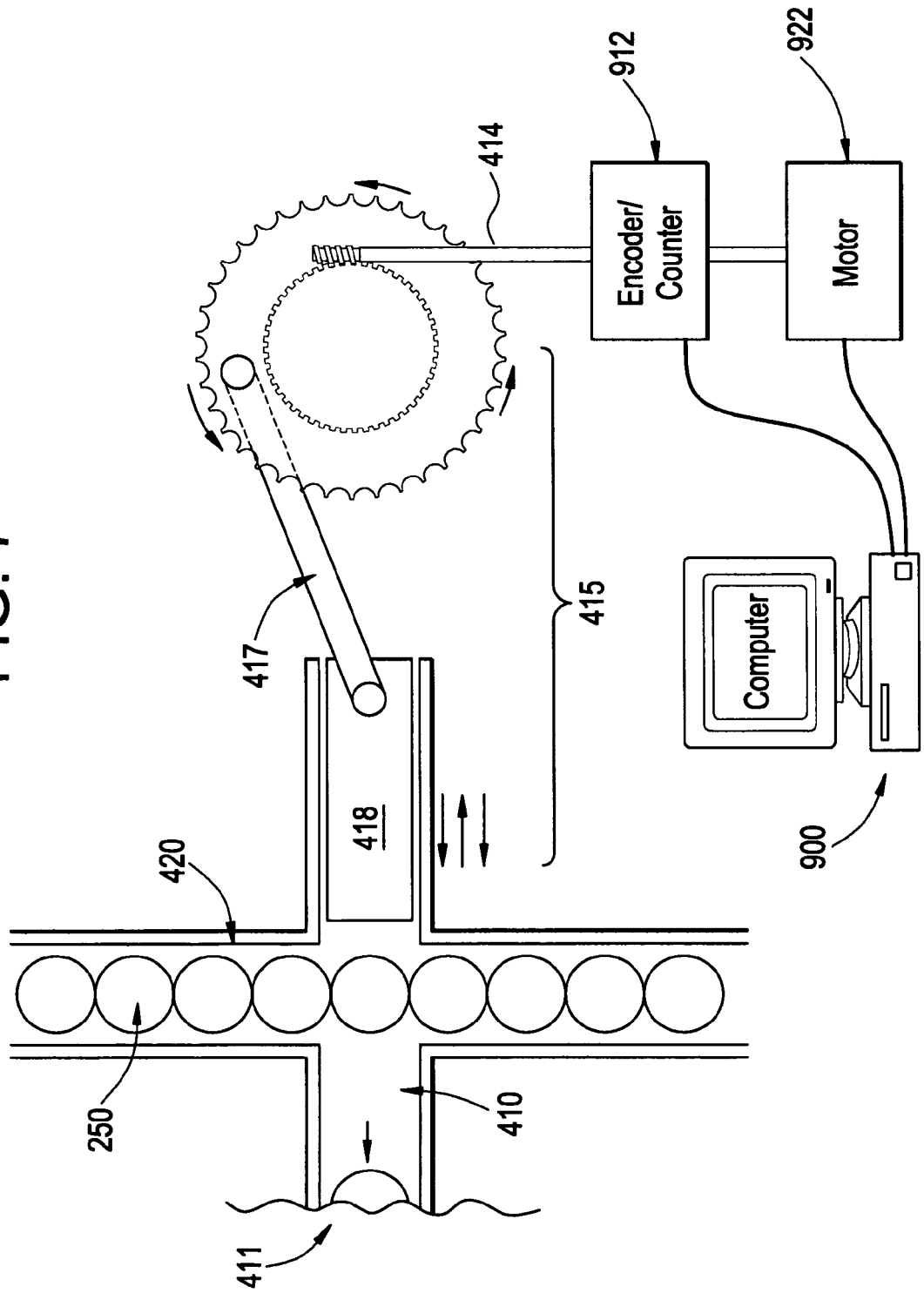
FIG. 7 is an illustration of an example embodiment removal mechanism usable with example embodiment systems.

FIG. 7 is an illustration of an example embodiment removal mechanism 415. As shown in FIG. 7, example embodiment removal mechanism 415 may include a push bar 418 connected to a shaft 417 and drive wheel 416 in a piston/wheel configuration. Drive wheel 416 may be driven by removal gearing 414 to rotate and push irradiation targets 250 into exit tube 410 from holding tube 420.

Removal gearing 414 may be a conventional cog connected to drive wheel 416 or may be a screw and worm gear configuration as shown in FIG. 7. Removal gearing 414 may be connected to driving power subsystem 390 and/or power drive shaft 325 (FIG. 5) at desired times in order to synchronously extract irradiation targets as they are moved by irradiation target drive subsystem 300. In this way, exact location and irradiation target 250 identification may be possible between subsystems, by maintaining target order and/or synchronously moving targets 250 through example embodiment radioisotope generation system 100. Alternatively, a motor 922 and/or digital counter 912 may be attached to drive shaft 325 in order to provide rotary location and timing to the computer 900. Such a system may be similar to the motor 921/digital counter 911 combination discussed above in FIG. 5 and may relay similar information to shared computer 900 to facilitate synchronization of irradiation target 250 movement and removal within/from example embodiment system 100.

Although example embodiment removal mechanism 415 is shown as a piston/wheel configuration, other types of removal mechanisms may be useable with example embodiments. For example, removal mechanism 415 may include a remotely operated actuator that simply pushes irradiation targets 250 into exit tube 410 upon actuation. Other types of removal mechanisms known in the art may be substituted for removal mechanism 415 as would be known to one skilled in the art.

As shown in FIG. 6, irradiation targets 250 may fill holding tube 420 down to a flow control mechanism 450. A make-up tube 460 may extend upward and around subsystems 400 and/or 300 to an irradiation target reservoir 419 in a spiral fashion. In this way, gravity may drive irradiation targets 250 down through make-up tube 460 to flow control mechanism 450. Although make-up tube 460 is shown as a spiral, any number of configurations may be used, including a straight or upward path from reservoir 419 aided by an additional drive system to push irradiation targets to flow control mechanism 450.

Flow control mechanism 450 may be a set of toothed and/or specially-surfaced gears similar to the drive gears 310a and 310b of irradiation target drive subsystem 300 (FIG. 5), and descriptions of redundant portions of these omitted. Flow control mechanism may include a horizontal pair of gears instead of being vertical as drive gears 310a and 310b. Similar to the gears 310a and 310b, the flow control mechanism 450 may be moved by worm gears connected to drive shaft by connecting gears. A drive shaft may be connected to a motor and/or counter, both of which may be connected to computer 900, which may further coordinate and control movement of irradiation targets 250 with flow control mechanism 450.

Flow control mechanism 450 may hold and/or move irradiation targets between make-up tube 460 and holding tube 420, which may both have openings near flow control mechanism 450. Because irradiation targets may be gravity-driven from reservoir 490, flow control mechanism 450 may serve to block irradiation targets from pushing up into holding tube 420 at undesired times. Flow control mechanism 450 may be driven by the same gear set 320 and/or power drive 325 as the irradiation target drive subsystem 300 (FIG. 5) so as to simplify and preserve synchrony of example embodiment radioisotope generation system 100. Software on computer 900 controlling flow control mechanism 450 may maintain synchronicity between all subsystems 200, 300, and 400.

Flow control mechanism 450 is shown as a set of toothed gears; however, several different types of blocking devices, such as actuators, valves, etc., may be used to control irradiation target movement between make-up tube 460 and holding tube 250.

By the configuration of example embodiment storage and removal system 400, irradiation target 250 order and linearity may be preserved from insertion to removal from example embodiment radioisotope generation system 100. For example, as irradiation targets 250 are fed into holding tube 420 from irradiation drive system 300 after being irradiated in the core, targets may be backed up and/or be driven into make-up tube 460 until all irradiation tubes are removed from instrumentation tube subsystem 200. Due to the gravity-driven nature of make-up tube 460, flow control mechanism 450 may permit the irradiated irradiation targets 250 to return up to removal mechanism 415, which may synchronously extract the queued irradiated irradiation targets 250 to the exit tube 410. In this way, the exact vertical order of irradiation targets, from topmost to bottommost position in tube 50, may be preserved as the irradiated irradiation targets 250 are directed outside containment 411.

Neutron flux within the core 15 is generally known or determinable to one skilled in the art. By preserving the linear order of irradiation targets in the core, example embodiment system 100 may provide maximum specific activity in irradiation targets 250. In this way, specific activity of irradiation targets 250 may be maximized by allowing targets ready for discharge to be placed at an axial position with flux conducive to generate a required specific activity for medical and/or industrial usage of irradiation target 250.

Further, by the configuration shown in FIG. 6, make-up tube 460 may have a length approximately equal to a length of instrumentation tube 50, thus preventing an incorrect count or overflow of irradiation targets into irradiation target drive subsystem 300 or tube subsystem 200. Reservoir 419 may store additional irradiation targets that may be released into make-up tube 460 after all previous, irradiated irradiation targets 250 have passed into holding tube 420. In this way, reservoir 419 may continuously provide irradiation targets 250 into example embodiment radioisotope generation system 100 and may maximize radioisotope production.

Reservoir 419 may act both as a target makeup repository and a repository for the placement of targets 250 exiting the stacked loop 460. When subsystem 300 and/or flow control mechanism 450 are advancing targets into the reactor core, additional targets 250 may be allowed to exit repository 419 by gravity and enter make-up tube 460. When targets are withdrawn from the reactor core, targets may move back into repository reservoir 419. Reservoir 419 may be a variety of shapes permitting such irradiation target movement, including, for example, a funnel-shaped reservoir.

The example embodiment irradiation target storage and removal subsystem 400 shown in FIG. 6 may facilitate ordered removal and/or storage of irradiation targets 250 containing short-term radioisotopes useable in medical and industrial applications; however, other example embodiment subsystems may successfully allow removal of irradiated irradiation targets 250 from the radioisotope generation system 100. For example, removal subsystem 300 may consist entirely of an exit tube directed outside of containment, such that irradiation targets 250 may directly exit the vessel 10 from irradiation target drive systems and/or be directly loaded into the vessel 10 therefrom.

Radioisotope Generation System Operation

Example embodiment radioisotope-generation systems being described above, it is possible to summarize the operation of such example embodiments to achieve example methods. Fresh irradiation targets 250 may be stored in reservoir 419 (FIG. 6) and/or held in makeup tube 460 by flow control mechanism 450. Upon release or activation of flow control mechanism 450, irradiation targets 250 may move up through holding tube 420, driven by gravity due to the reservoir 419 being above holding tube 420 and or by flow control mechanism.

Once a sufficient amount of irradiation targets 250 have been passed into holding tube 420, irradiation targets 250 may exit holding tube 420 near driving gears 310a and 310b (FIG. 5). Driving gears 310a and 310b may be rotated to mate with the irradiation targets 250 emerging from holding tube 420. Driving gears 310a and 310b may sequentially move the irradiation targets 250 into sleeve 260 (FIG. 3) while preserving the order of irradiation targets 250. Irradiation targets 250 may be continually driven into sleeve 260 so as to pass into instrumentation tube 50 through opening 51 and up into core 15. Once instrumentation tube 50 and sleeve 260 are filled with irradiation targets, driving gears 310a and 310b may hold the irradiation targets in place in the tube 50.

The core 15 may be operation at some point while irradiation targets are held in the tube 50 and core 15. Knowing the axial flux profile of the core 15 and the irradiation target 250 makeup, irradiation targets may be held within core 15 for a time period to substantially convert irradiation targets 250 into desired radioisotopes.

Upon completion of the desired time period, driving gears 310a and 310b may stop holding the targets 250 within tube 50 and sleeve 260 and/or reverse direction in order to allow irradiation targets to pass from the sleeve 260 back into holding tube 420. This downward drive of the irradiation targets 250 may back up other irradiation targets in holding tube 420 or makeup tube 460 further back into makeup tube 460. Holding mechanism 450 may further aid in backing irradiation targets into makeup tube 460 or, alternately, may prevent any irradiation targets from entering holding tube or remove those targets 250 that do such that holding tube 420 is empty when irradiated irradiation targets 250 pass down into holding tube 420.

Once all irradiated irradiation targets 250 are emptied from sleeve 260 into holding tube 420, holding mechanism 450 may drive, or allow gravity to drive, the irradiated irradiation targets 250 into an exit tube 410 (FIG. 7). A removal mechanism 415 may synchronously push the irradiation targets 250 into exit tube 410 with their movement by holding mechanism 450.

From exit tube 410, irradiated irradiation targets 250 may be removed from containment 411 and harvested for medical or industrial use. Throughout the operation of example embodiment systems, irradiation targets 250 maintain a linear order. The entire process described above may be automated by remote user or computer 900 that drives the various subsystems as described above with regard to each subsystem. For example, a remote computer 900 may initiate target 250 insertion into the core 15 and may calculate the axial flux profile of the core 15 and the neutronic characteristics of the irradiation targets 250 being placed in the core 15. Knowing the linear order of the irradiation targets and hence their axial placement in the core, the computer may calculate a desired exposure time. Upon passage of the exposure time, the computer may initiate target 250 removal from the core and, once all targets 250 are removed from core 15, the computer 900 may initiate removal of targets 250 from example embodiment systems and containment 411. The exact activity and radiation properties of each irradiation target 250 may be calculated in its linear order upon removal, allowing harvesting and use of radioisotopes present in irradiated irradiation targets 250.

Irradiation Targets

Figure 8A:
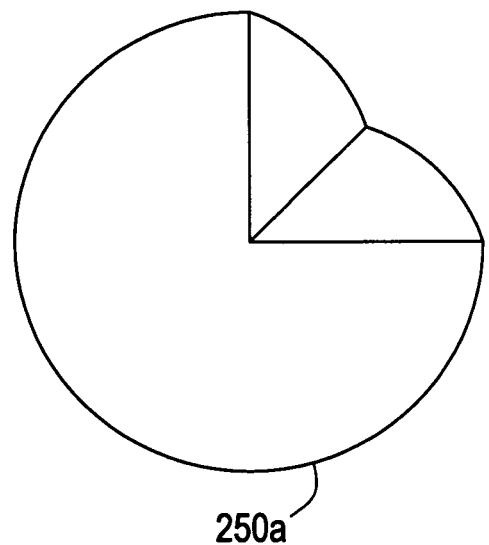
FIGS. 8A and 8B are illustrations of example embodiment irradiation targets.
Figure 8B:
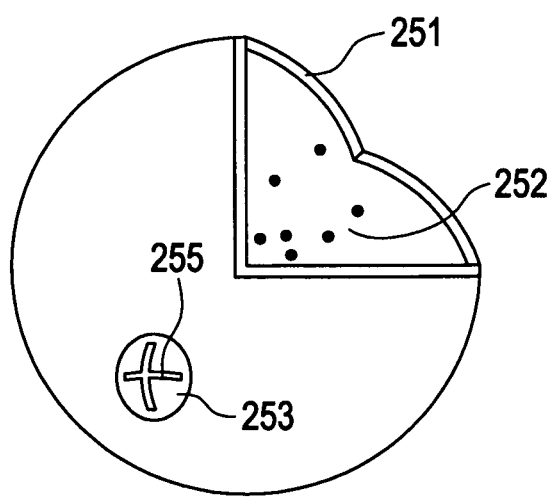

FIGS. 8A and 8B are illustrations of example embodiment irradiation targets 250a and 250b. As shown in FIG. 8A, irradiation target 250a may be roughly spherical so as to permit rotation and rolling through example embodiment apparatuses. However, as discussed above, irradiation targets may be other shapes as well. For example, hexahedrons and/or cylinders may be useable as irradiation targets 250 in order to prevent rolling in some or all directions or to accommodate different instrumentation tube 50 geometries and/or locations. Surfaces of driving gears and tube shapes may be varied to match these different irradiation target geometries.

As shown in FIG. 8A, irradiation target 250a may be generally solid and fabricated from a material that converts to a useful radioisotope when exposed to neutron flux present in an operating commercial nuclear reactor. Alternatively, different materials may be plated or layered at different radii in irradiation target 250a to allow easier handling and harvesting of radioisotopes from irradiation target 250a.

Alternatively, as shown in FIG. 8B, irradiation target 250b may be generally hollow and include a liquid, gaseous, and/or solid material that converts to a useful gaseous, liquid, and/or solid radioisotope when exposed to neutron flux present in an operating commercial nuclear reactor. A shell 251 may surround and contain the solid liquid, or gaseous target material 252, the shell 251 having negligible physical changes when exposed to a neutron flux, including, for example, stainless steel and/or aluminum. An access port 253 may permit access through shell 251 for harvesting radioisotopes produced in irradiation target 250b. For example, access port 253 may be welded or threaded into shell 251 so as to provide a seal for the gaseous/liquid/solid target material 252 and produced radioisotope. Access port 253 may include a frangible area 255 that readily tears, is easily punctured, etc. when subjected to an appropriate outside force when the gaseous/liquid/solid radioisotope is ready to be harvested.

Although example embodiment radioisotope generation system 100 has been described in detail as an apparatus useable to perform example methods of producing and harvesting short-term isotopes, it is understood that other apparatuses may be used to perform example methods. For example, a closed sleeve containing irradiation targets may be inserted and removed from instrumentation tubes of operating commercial reactors in a "cartridge"-like fashion at various intervals in order to properly expose the irradiation targets to neutron flux sufficient to create useable short-term radioisotopes.

Several different radioisotopes may be generated in example embodiments and example methods. Example embodiments and example methods may have a particular advantage in that they permit generation and harvesting of short-term radioisotopes in a relatively fast timescale compared to the half-lives of the produced radioisotopes, without shutting down a commercial reactor, a potentially costly process, and without hazardous and lengthy isotopic and/or chemical extraction processes. Although short-term radioisotopes having diagnostic and/or theraputic applications are producible with example apparatuses and methods, radioisotopes having industrial applications and/or long-lived half-lives may also be generated.

Irradiation targets 250 and amount of exposure time in instrumentation tube 50 may be selected in example methods and apparatuses to determine the type and concentration of radioisotope produced. That is, as discussed above, because axial flux levels are known within an operating reactor, and because example embodiments may permit precise control of axial position of irradiation targets 250 used in example embodiment apparatuses and methods, the type and size of irradiation target 250 and exposure time may be used to determine the resulting radioisotopes and their strength. It is known to one skilled in the art and from reference to conventional decay and cross-section charts what types of irradiation targets 250 will produce desired radioisotopes given exposure to a particular amount of neutron flux. Further, irradiation targets 250 may be chosen based on their relatively smaller neutron cross-section, so as to not interfere substantially with the nuclear chain reaction occurring in an operating commercial nuclear reactor core.

For example, it is known that Molybdenum-99 may be converted into Technetium-99m having a half-life of approximately 6 hours when exposed to a particular amount of neutron flux. Technetium-99m has several specialized medical uses, including medical imaging and cancer diagnosis, and a short-term half-life. Using irradiation targets 250 fabricated from Molybdnenum-99 and exposed to neutron flux in an operating reactor based on the size of target 250, Technetium-99m may be generated and harvested in example embodiment apparatuses and methods by determining the size of the irradiation target containing Mo-99, the axial position of the target in the operational nuclear core, the axial profile of the operational nuclear core, and the amount of time of exposure of the irradiation target.

Table 1 below lists several short-term radioisotopes that may be generated in example methods using an appropriate irradiation target 250. The longest half-life of the listed short-term radioisotopes may be approximately 75 days. Given that reactor shutdown and spent fuel extraction may occur as infrequently as two years, with radioisotope extraction and harvesting from fuel requiring significant process and cool-down times, the radioisotopes listed below may not be viably produced and harvested from conventional spent nuclear fuel.

TABLE 1

List of potential radioisotopes produced

| Parent Material | Radioisotope Produced | Half-Life (approx) | | Potential Use |
|---|---|---|---|---|
| Molybdenum-99 | Technetium-99m | 6 | hours | Imaging of cancer & poorly permiated organs |
| Chromium-50 | Chromium-51 | 28 | days | Label blood cells and gasto-intestinal disorders |
| Copper-63 | Copper-64 | 13 | hours | Study of Wilson's & Menke's diseases |
| Dysprosium-164 | Dysprosium-165 | 2 | hours | Synovectomy treatment of arthritis |
| Erbium-168 | Erbium-169 | 9.4 | days | Relief of arthritis pain |
| Holmium-165 | Holmium-166 | 27 | hours | Hepatic cancer and tumor treatment |
| Iodide-130 | Iodine-131 | 8 | days | Thyroid cancer and use in beta therapy |
| Iridium-191 | Iridium-192 | 74 | days | Internal radiotherapy cancer treatment |
| Iron-58 | Iron-59 | 46 | days | Study of iron metabolism and splenaic disorders |
| Lutetium-176 | Lutetium-177 | 6.7 | days | Imagine and treatment of endocrine tumors |
| Palladium-102 | Palladium-103 | 17 | days | Brachytherapy for prostate cancer |
| Phosphorus-31 | Phosphorous-32 | 14 | days | Polycythemia vera treatment |
| Potassium-41 | Potassium-42 | 12 | hours | Study of coronary blood flow |
| Rhenium-185 | Rhenium-186 | 3.7 | days | Bone cancer therapy |
| Samarium-152 | Samarium-153 | 46 | hours | Pain relief for secondary cancers |
| Selenium-74 | Selenium-75 | 120 | days | Study of digestive enzymes |
| Sodium-23 | Sodium-24 | 15 | hours | Study of electrolytes |
| Strontium-88 | Strontium-89 | 51 | days | Pain relief for prostate and bone cancer |
| Ytterbium-168 | Ytterbium-169 | 32 | days | Study of cerebrospinal fluid |
| Ytterbium-176 | Ytterbium-177 | 1.9 | hours | Used to produce Lu-177 |
| Yttrium-89 | Yttrium-90 | 64 | hours | Cancer brachytherapy |

Table 1 is not a complete list of radioisotopes that may be produced in example embodiments and example methods but rather is illustrative of some radioisotopes useable with medical therapies including cancer treatment. With proper target selection, almost any short-term radioisotope may be produced and harvested for use through example embodiments and methods.

Example embodiments thus being described, it will be appreciated by one skilled in the art that example embodiments may be varied through routine experimentation and without further inventive activity. Variations are not to be regarded as departure from the spirit and scope of the exemplary embodiments, and all such modifications as would be obvious to one skilled in the art are intended to be included within the scope of the following claims.

What is claimed is:

1. A method of producing radioisotopes, the method comprising:
choosing at least one irradiation target with a known neutron cross-section, the irradiation target not being a neutron detector;
inserting the irradiation target into an instrumentation tube of a nuclear reactor, the instrumentation tube extending into the reactor and having an opening accessible from an exterior of the reactor, to expose the irradiation target to neutron flux encountered in the nuclear reactor when operating, the irradiation target substantially converting to a radioisotope when exposed to a neutron flux encountered in the nuclear reactor, the inserting including positioning the irradiation target at an axial position in the instrumentation tube for an amount of time corresponding to an amount of time required to convert the irradiation target to a radioisotope at a flux level corresponding to the axial position based on an axial neutron flux profile of the nuclear reactor; and
removing the irradiation target and produced radioisotope from the instrumentation tube.

2. The method of claim 1, wherein the nuclear reactor is a 100+ Megawatt-electric nuclear reactor.

3. The method of claim 1, wherein the inserting and the removing are performed while the nuclear reactor is operating.

4. The method of claim 1, wherein the radioisotope produced has a half-life of 75 days or less.

5. The method of claim 4, wherein the irradiation target is one chosen from the group consisting of Molybdenum-99, Chromium-50, Copper-63, Dysprosium-164, Erbium-168, Holmium-165, Iodide-130, Iridium-191, Iron-58, Lutetium-176, Palladium-102, Phosphorus-31, Potassium-41, Rhenium-185, Samarium-152, Selenium-74, Sodium-23, Strontium-88, Ytterbium-168, Ytterbium-176, and Yttrium-89.

6. The method of claim 4, wherein the produced radioisotope is one chosen from the group consisting of Technetium-99m, Chromium-51, Copper-64, Dysprosium-165, Erbium-169, Holmium-166, Iodine-131, Iridium-192, Iron-59, Lutetium-177, Palladium-103, Phosphorous-32, Potassium-42, Rhenium-186, Samarium-153, Selenium-75, Sodium-24, Strontium-89, Xenon-133, Ytterbium-169, Ytterbium-177, and Yttrium-90.

7. The method of claim 1, further comprising:
removing the irradiation target and produced radioisotope from a containment structure surrounding the nuclear reactor.

8. A method of producing radioisotopes, the method comprising:
choosing at least one irradiation target with a known neutron cross-section;
inserting the irradiation target into an instrumentation tube of a nuclear reactor, the instrumentation tube extending into the reactor and having an opening accessible from an exterior of the reactor, to expose the irradiation target to neutron flux encountered in the nuclear reactor when operating, the irradiation target substantially converting to a radioisotope when exposed to a neutron flux encountered in the nuclear reactor, the inserting including positioning the irradiation target at an axial position in the instrumentation tube for an amount of time corresponding to an amount of time required to convert a substantial portion of the irradiation target to a radioisotope at a flux level corresponding to the axial position based on an axial neutron flux profile of the nuclear reactor; and
removing the irradiation target and produced radioisotope from the instrumentation tube.

\* \* \* \* \*